US009710121B2

(12) United States Patent
Calpe Maravilla et al.

(10) Patent No.: US 9,710,121 B2
(45) Date of Patent: Jul. 18, 2017

(54) POSITION DETERMINATION TECHNIQUES IN RESISTIVE TOUCH SCREEN APPLICATIONS

(71) Applicant: Analog Devices, Inc., Norwood, MA (US)

(72) Inventors: Javier Calpe Maravilla, Algemesi (ES); Italo Carlos Medina, Raheen (IE); Maria Jose Martinez, Valencia (ES); Alberto Carbajo Galve, Valencia (ES)

(73) Assignee: ANALOG DEVICES, INC., Norwood, MA (US)

( * ) Notice: Subject to any disclaimer, the term of this patent is extended or adjusted under 35 U.S.C. 154(b) by 282 days.

(21) Appl. No.: 14/555,156

(22) Filed: Nov. 26, 2014

(65) Prior Publication Data
US 2015/0084924 A1 Mar. 26, 2015

Related U.S. Application Data

(62) Division of application No. 13/194,567, filed on Jul. 29, 2011, now abandoned.

(51) Int. Cl.
*G06F 3/045* (2006.01)
*G06F 3/041* (2006.01)

(52) U.S. Cl.
CPC .......... *G06F 3/045* (2013.01); *G06F 3/0416* (2013.01); *G06F 2203/04104* (2013.01)

(58) Field of Classification Search
CPC ................ G06F 3/045; G06F 3/0416; G06F 2203/04104; G06F 3/0418

USPC .................. 345/173, 174; 178/18.01–18.05
See application file for complete search history.

(56) References Cited

U.S. PATENT DOCUMENTS

| 3,750,149 | A | 7/1973 | Sessler et al. |
|---|---|---|---|
| 7,633,300 | B2 | 12/2009 | Keroe et al. |
| 8,106,892 | B2 | 1/2012 | Felder et al. |
| 8,416,215 | B2 | 4/2013 | Sherman |
| 8,797,277 | B1 | 8/2014 | Grygorenko |

(Continued)

FOREIGN PATENT DOCUMENTS

| CN | 101308431 A | 11/2008 |
|---|---|---|
| CN | 101751194 A | 6/2010 |

(Continued)

OTHER PUBLICATIONS

Analog Devices, Inc., "Low Voltage Controller for Touch Screens," AD7879 Datasheet, Rev. C, Nov. 2010.

(Continued)

*Primary Examiner* — Rodney Amadiz
(74) *Attorney, Agent, or Firm* — Patent Capital Group

(57) ABSTRACT

Systems and methods to determine locations for dual touch operations performed on a four-wire resistive touch screen. The systems and methods may include measuring signals from pairs of electrodes on each of a first and second resistive sheet of the resistive touch screen in two phases of operation. The systems and methods may further include determining touch screen segment resistances from the signal measurements. The systems and methods may determine locations corresponding to the dual touch operations from the resistances. The systems and methods may also determine locations from the signal measurements.

14 Claims, 13 Drawing Sheets

(56) References Cited

U.S. PATENT DOCUMENTS

| | | |
|---|---|---|
| 2002/0101407 A1 | 8/2002 | Berelovich et al. |
| 2006/0197752 A1 | 9/2006 | Hurst et al. |
| 2006/0284856 A1 | 12/2006 | Soss |
| 2007/0052690 A1 | 3/2007 | Roberts |
| 2007/0200833 A1 | 8/2007 | Park et al. |
| 2008/0117178 A1 | 5/2008 | Ko et al. |
| 2009/0044988 A1 | 2/2009 | Chang et al. |
| 2009/0066663 A1 | 3/2009 | Chang et al. |
| 2009/0073134 A1 | 3/2009 | Huang et al. |
| 2009/0159343 A1* | 6/2009 | Chung .................... G06F 3/045 178/18.05 |
| 2009/0189877 A1 | 7/2009 | Washino et al. |
| 2009/0322699 A1 | 12/2009 | Hansson |
| 2009/0322700 A1 | 12/2009 | D'Souza et al. |
| 2009/0322701 A1 | 12/2009 | D'Souza et al. |
| 2010/0001977 A1 | 1/2010 | Lin et al. |
| 2010/0053109 A1 | 3/2010 | Narita |
| 2010/0164905 A1 | 7/2010 | Woo et al. |
| 2010/0277417 A1 | 11/2010 | Sarasmo |
| 2010/0283761 A1 | 11/2010 | Chang |
| 2011/0043462 A1 | 2/2011 | Shabra et al. |
| 2012/0001854 A1 | 1/2012 | Tikkanen |
| 2012/0032893 A1 | 2/2012 | Calpe Maravilla et al. |
| 2012/0068969 A1 | 3/2012 | Bogana et al. |

FOREIGN PATENT DOCUMENTS

| | | |
|---|---|---|
| TW | I283366 B | 7/2007 |
| WO | 2010137046 A | 12/2010 |

OTHER PUBLICATIONS

Charles Murray, "Resistive Panels Move Into Multi-touch Space", Design News, Jun. 30, 2011.

International Search Report and Written Opinion of the International Searching Authority in counterpart International Application No. PCT/US2012/48474, report dated Oct. 10, 2012.

PCT International Search Report from PCT/US11/46310 mailed on Dec. 19, 2011.

Phil Ling, "Resistive Multi-Touch Becomes Reality", EE Times, Mar. 7, 2011.

* cited by examiner

500

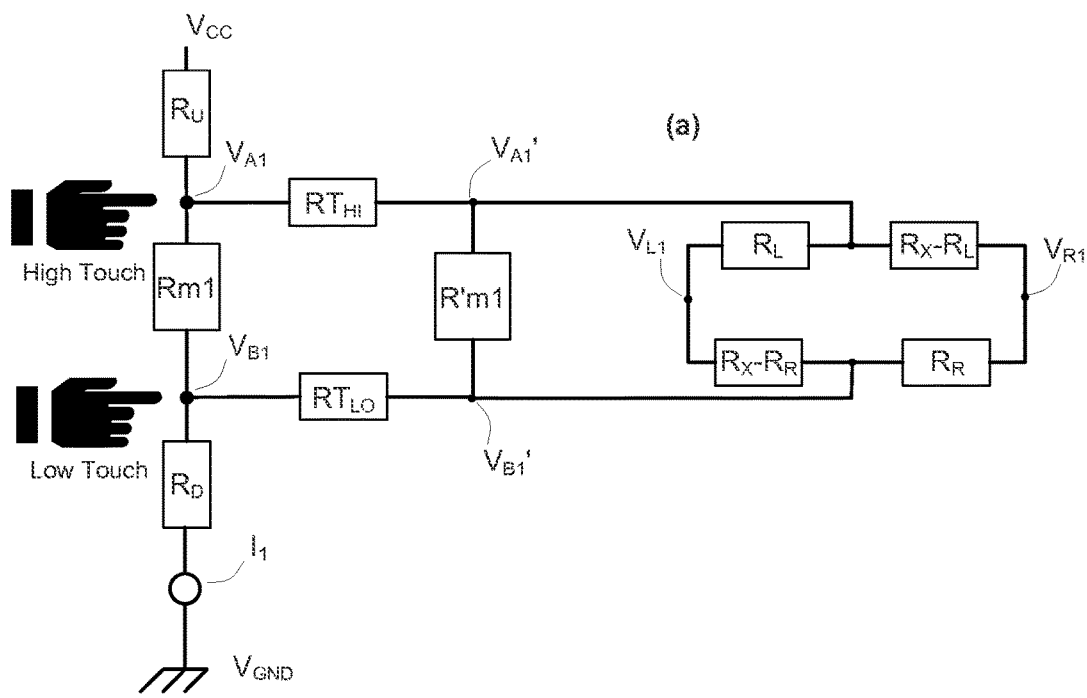
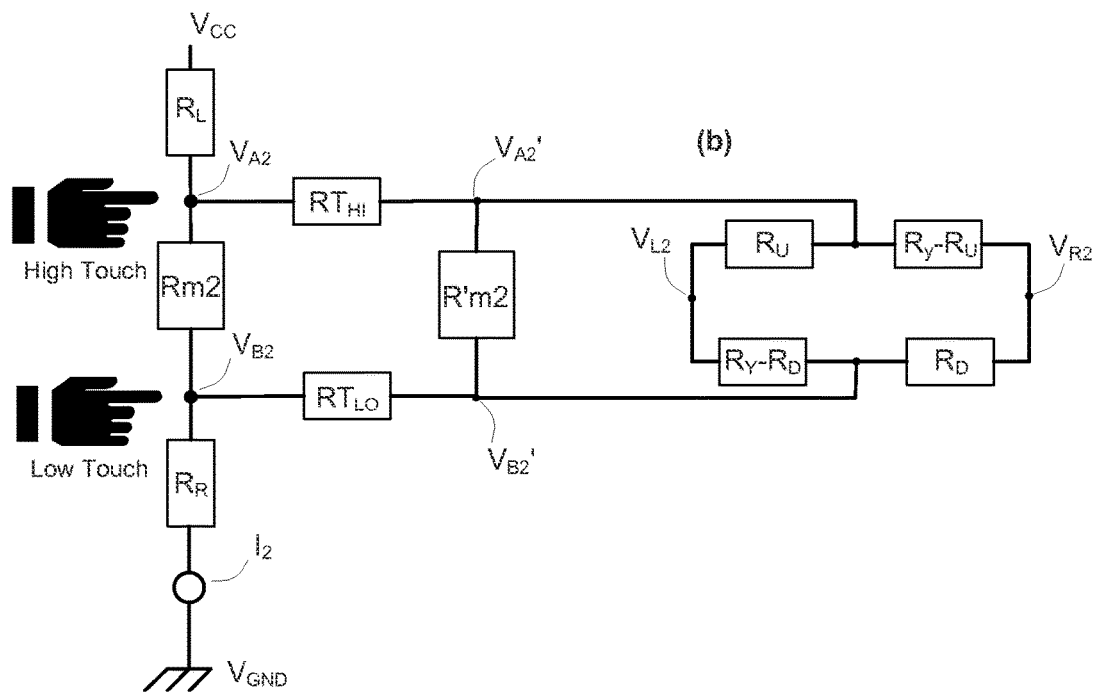
FIG. 6
600

900

1200

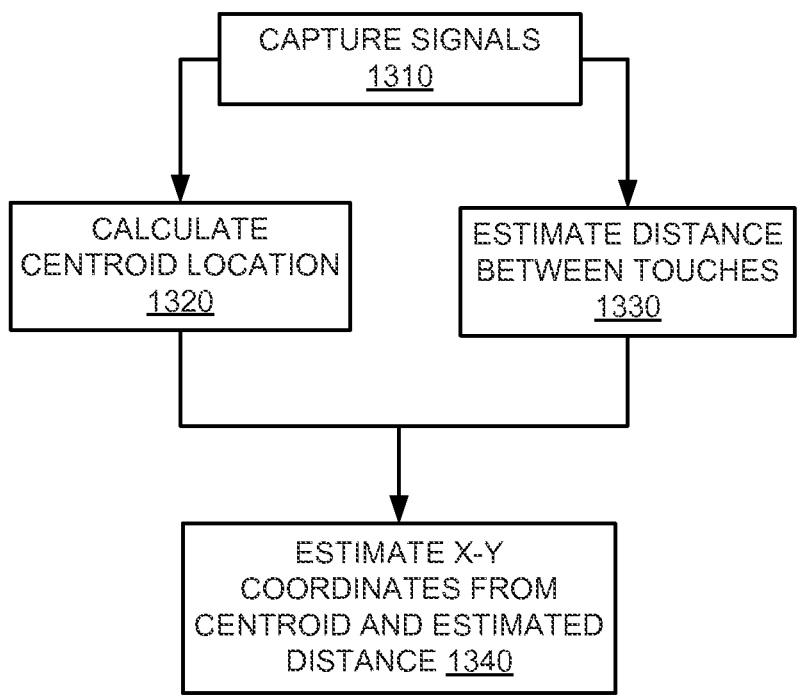

POSITION DETERMINATION TECHNIQUES IN RESISTIVE TOUCH SCREEN APPLICATIONS

CROSS-REFERENCE TO RELATED APPLICATIONS

This application is a divisional of, and claims priority to, U.S. patent application Ser. No. 13/194,567, filed on Jul. 29, 2011, which is hereby incorporated by reference in its entirety. This application also relates to U.S. patent application Ser. No. 12/851,291, filed Aug. 5, 2010.

BACKGROUND

A 4-wire resistive touch screen is an electronic device that registers when a physical touch may occur on the screen. Generally, the structure of a 4-wire resistive touch screen is well known. FIG. 1 illustrates a typical 4-wire resistive touch screen 100. The screen 100 may include a first plastic film layer (a Y layer) 110 with a transparent resistive coating on a bottom side, a pair of Y+ and Y− electrodes 112 at the vertical edges of the first layer 110. The screen 100 may further include a second plastic film layer (an X layer) 120 spaced apart from the first layer 110 with a transparent, resistive coating on a top side and a pair of X+ and X− electrodes 122 at the horizontal edges of the second layer 120. The screen 100 may also include an LCD screen 130 positioned below the two plastic film layers 110, 120 that may display image content viewable through the two plastic film layers 110, 120.

During a touch operation, a user touches a point on the touch screen 100 which causes the first layer 110 to deflect and make contact with the second layer 120. Approximate X-Y Cartesian coordinates of the point of contact are then determined. In a first phase, voltage is driven on the Y layer (say, layer 110) and a voltage is read from a single electrode of the X layer (say, layer 120). In a second phase, a voltage is driven on the X layer, and a voltage is read from a single electrode of the Y layer. A high impedance input device is used to read voltages from the sensing layer in each phase, which minimizes voltage losses in the sensing layer. Thus, voltages sensed at the electrodes of the sensing layer represent the voltage at the point of contact between the two layers. For ease of reference, the layer that is driven by the applied voltage may be called the "active" layer, and the sensing layer may be called the "passive" layer. Voltages read through each operation phase are digitized and converted to a value representing the single-point of contact in the X-Y axis at which the layers touch each other.

It may be desirable for a user to touch a screen in single or dual points of contact during a touch operation. Some touch screen systems have attempted to determine the locations for dual point touches, but these systems involve special screens or are inefficient.

Accordingly, there is a need in the art for techniques to determine the locations of dual touches performed on a four-wire resistive touch screen.

BRIEF DESCRIPTION OF THE DRAWINGS

FIG. 6 illustrates an electrical model 600 of a four-wire resistive touch screen describing the relationship between a resistive touch screen segment resistances and two touch positions according to an embodiment of the present invention.

FIG. 13 illustrates a method 1300 for determining estimated locations for a dual touch operation performed on a four-wire resistive touch screen from a centroid calculation and an estimated touch distance according to an embodiment of the present invention.

DETAILED DESCRIPTION

Embodiments of the present invention provide systems and methods to determine locations for dual touch operations performed on a four-wire resistive touch screen. The systems and methods may include measuring signals from pairs of electrodes on each of a first and second resistive sheet of the resistive touch screen in two phases of operation. The systems and methods may further include determining touch screen segment resistances from the signal measurements. The systems and methods may determine locations corresponding to the dual touch operations from the segment resistances. The systems and methods may also determine locations from the signal measurements.

Figure 1:
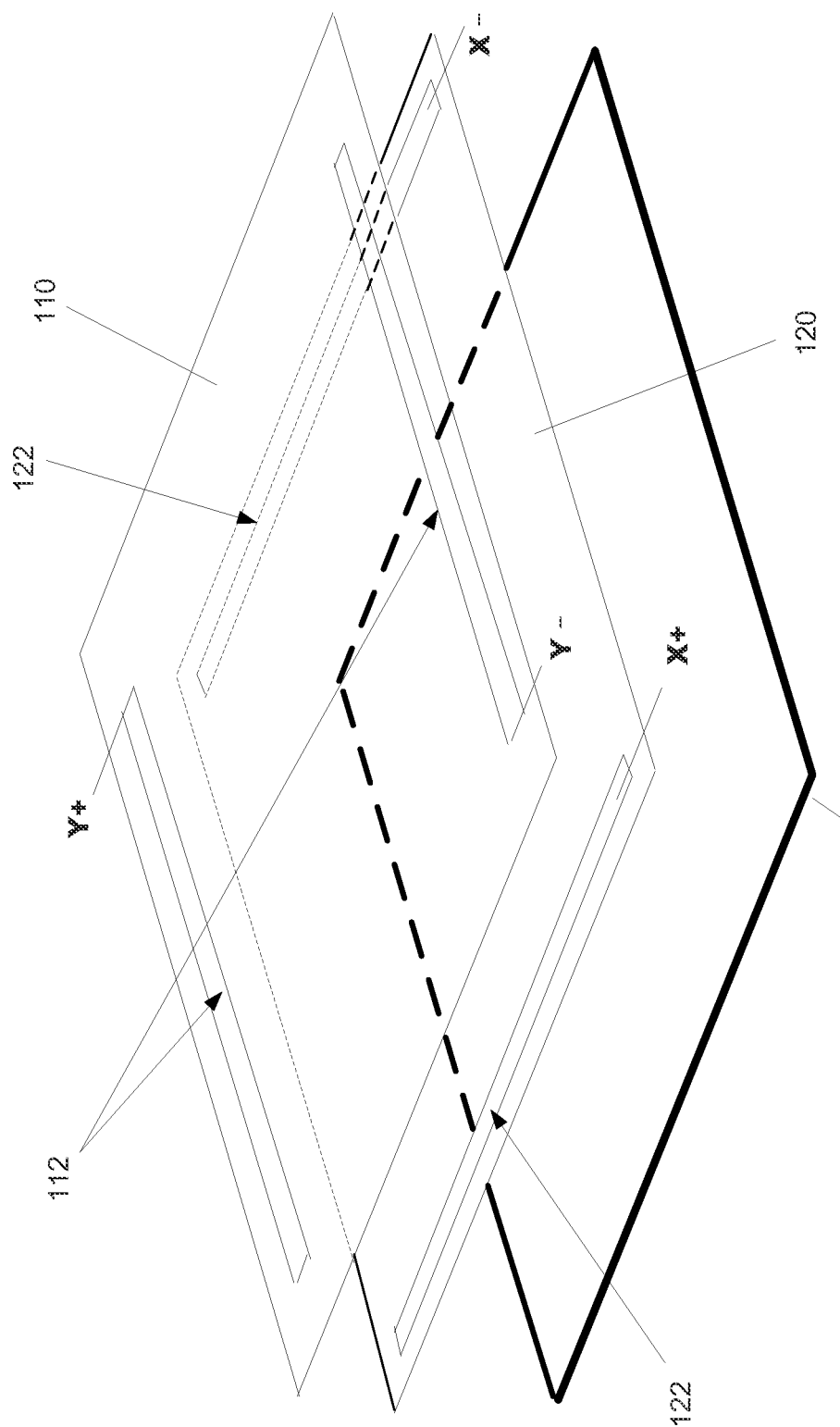
FIG. 1 illustrates a typical 4-wire resistive touch screen 100.
Figure 2:
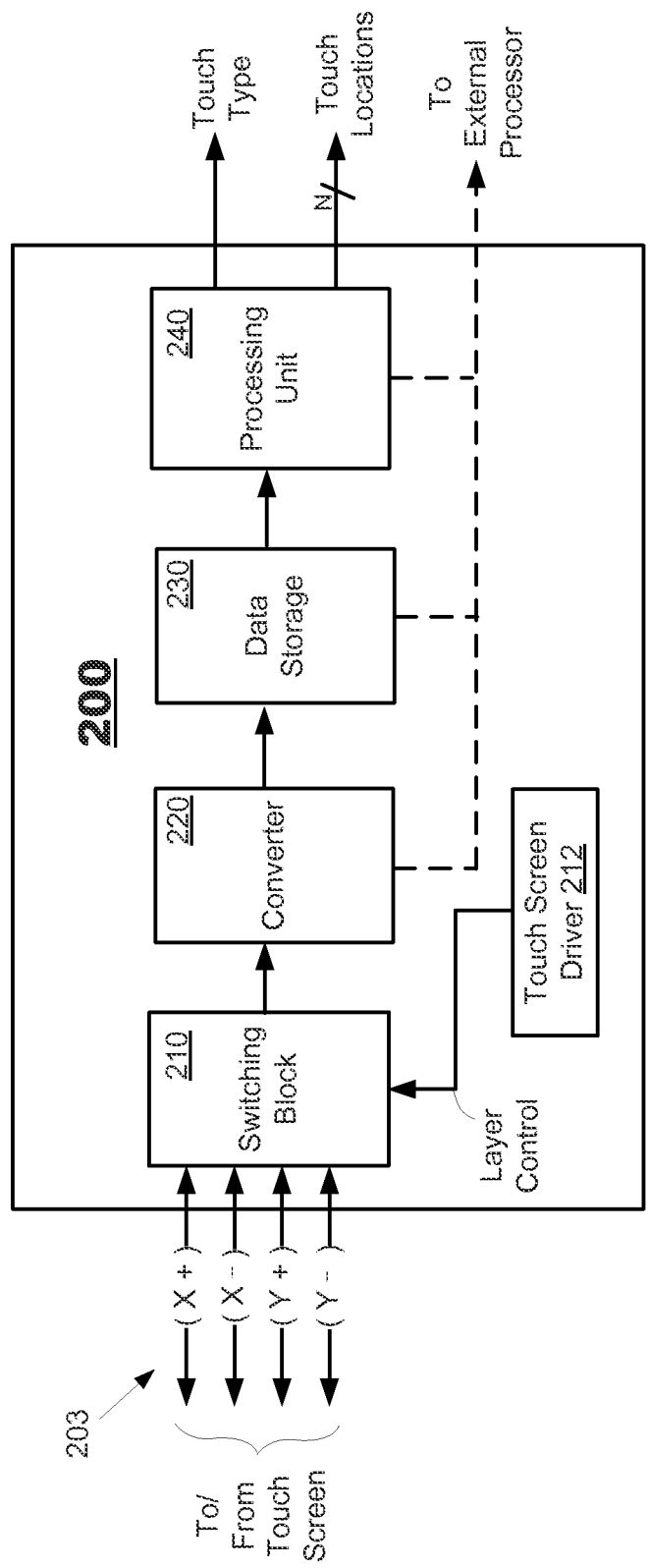
FIG. 2 illustrates a touch determination system 200 according to an embodiment of the present invention.

FIG. 2 illustrates a touch determination system 200 according to an embodiment of the present invention. The system 200 may include a switching block 210, a converter 220, a data storage 230, a processing unit 240 and a touch screen driver 212. The switching block 210 may manage an interface between the touch screen (not shown) and the system 200. For example, it may connect driving voltages from the touch screen driver 212 to the X and Y layers of the touch screen to cause them to operate as active and passive layers during various phases of operation. The switching block 210 also may capture input signals 203 from the touch screen electrodes (X+, X−, Y+, and Y−) and output them to the converter 220.

The converter 220 may digitize captured signals output from the switching block 210 and output digitized values to the storage unit 230. The processing unit 240 may interpret the digitized signals to determine a type of touch being made (e.g., single or dual touch) and to resolve coordinates of the touch(es). The processing unit 240 may include outputs to indicate touch type and touch location(s).

In an embodiment, the touch determination system 200 may be manufactured in a common integrated circuit. In an embodiment, inputs/outputs to/from the switching block 210 and outputs from the processing unit 240 may be coupled respectively to input/output pins and output pins of the integrated circuit.

The switching block 210 may capture signals from the electrodes in either the voltage or current domain. When capturing voltages, the switching block 210 may include a plurality of sampling capacitors (not shown) coupled to each of the voltages. When capturing currents, the switching block may include a plurality of resistor paths (not shown) coupled to each of the voltages. In other embodiments, the switching block 210 may include filters to reduce noise or to improve accuracy prior to determining touch positions.

Figure 3:
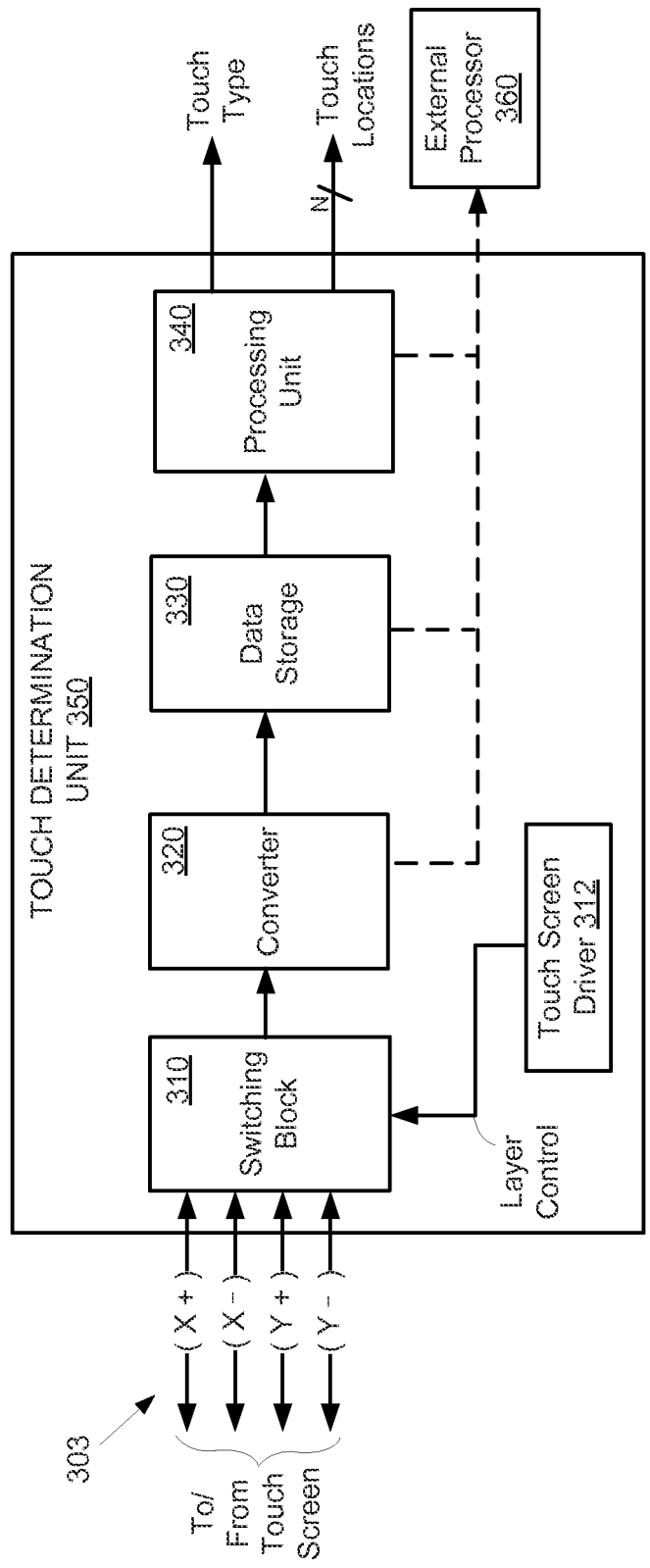
FIG. 3 illustrates a touch processing system 300 according to an embodiment of the present invention.

FIG. 3 illustrates a touch processing system 300 according to an embodiment of the present invention. The system 300 may include a touch determination unit 350. The touch determination unit 350 may include a switching block 310. The switching block may have bidirectional connections for driving and receiving signals 303 coupled to electrodes (X+, X−, Y+, and Y−) of a resistive touch screen (not shown), inputs for receiving layer control signals from a resistive touch screen driver 312, and outputs coupled to a converter 320. The system 300 may further include data storage 330 coupled to the output of the converter 320, a processing unit 340 coupled to the data storage 330, and an external processor 360 coupled to various outputs from the touch determination unit 350.

The system 300 may provide various outputs to an external processor 360. The system 300 may operate in a similar manner as discussed for system 200 of FIG. 2. However, in one embodiment, the converter 320 may output digital codes from the system 300 directly to the external processor 360 that may determine touch positions. In another embodiment, the converter 320 may output analog signal values to the external processor 360 that may determine touch positions. In yet another embodiment, data may be provided to, or extracted directly by, the external processor 360 from either the data storage 330 or the processing unit 340 so that the processor 360 may determine touch positions.

In an embodiment, the touch determination unit 350 may be manufactured in a common integrated circuit. In an embodiment, inputs/outputs to/from the switching block 310 and outputs from the processing unit 340 may be coupled respectively to input/output pins and output pins of the integrated circuit.

Figure 4:
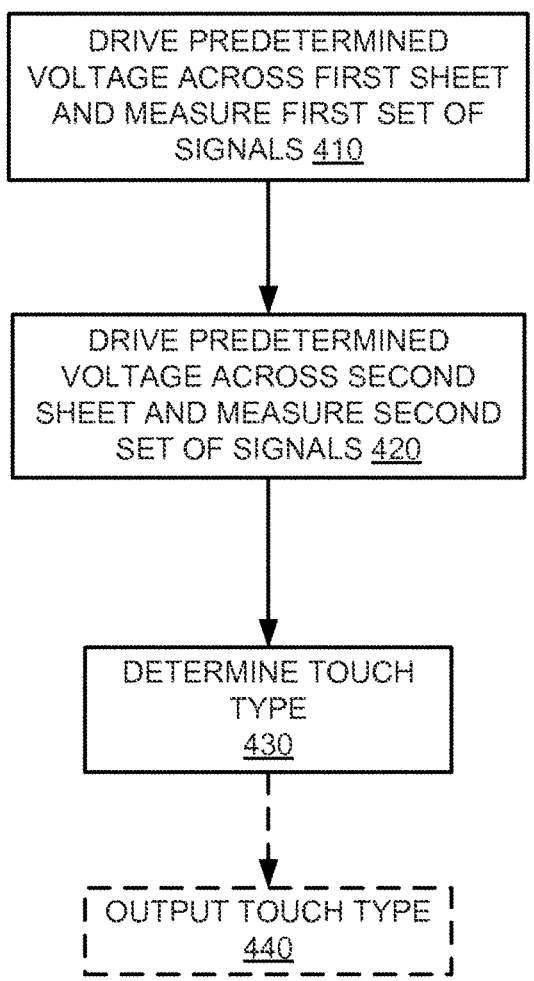
FIG. 4 illustrates a method 400 for determining a touch type according to an embodiment of the present invention.

FIG. 4 illustrates a method 400 for classifying a touch type according to an embodiment of the present invention. In addition to characterizing touch positions, a touch determination unit as illustrated in FIGS. 2-3 may also further characterize a touch type that may occur on a resistive touch screen. During the occurrence of a single touch operation, the currents flowing through an active layer may be constant. However, during a dual touch operation the current flowing through the active layer(s) may decrease as a function of the distance between and the applied pressure of dual touches. Accordingly, a method 400 as illustrated in FIG. 4 may detect a touch type and touch positions for various touch operations.

As illustrated in block 410, the method 400 may drive a predetermined voltage across a first resistive sheet of the resistive touch screen and measure a first set of signals from pairs of electrodes on the first resistive sheet and a second resistive sheet. The method 400 may drive the predetermined voltage across the second resistive sheet and measure a second set of signals from pairs of electrodes on the first resistive sheet and the second resistive sheet (block 420). The method 400 may classify a touch type as either a single touch type or a dual touch type based on the measured signals (block 430). In an embodiment, after classifying a touch type, the method may then output an indicator of touch type (block 440).

Figure 5:
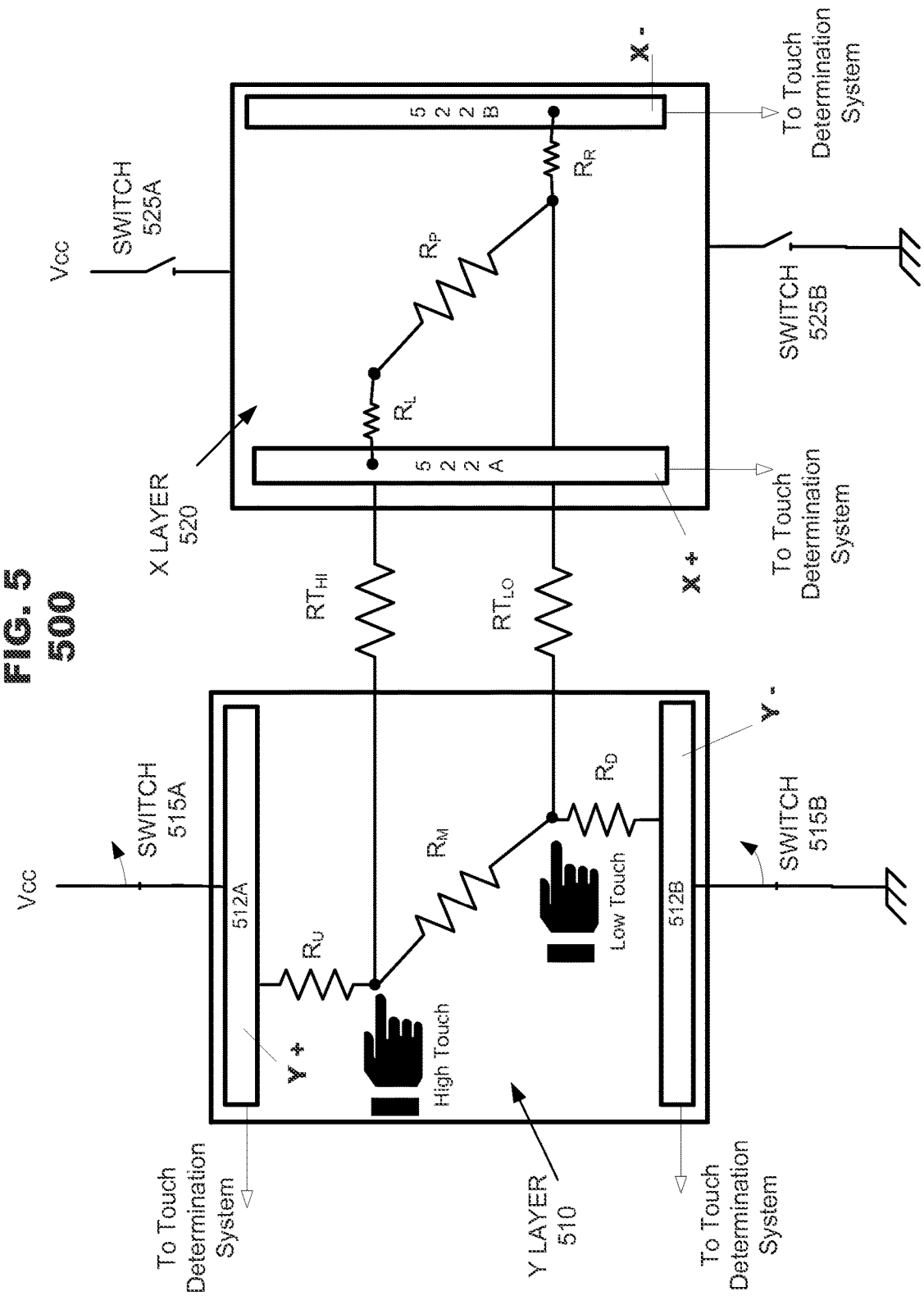
FIG. 5 models operation of a four-wire resistive touch screen during a multi-touch event.

FIG. 5 models operation of a four-wire resistive touch screen during a dual touch operation. Since the touch screen layers may alternate between active and passive layers, for ease of reference, a Y layer 510 may be described as the active layer, while an X layer 520 may be described as the passive layer. The system 500 may include, in the active layer, switches 515A, 515B having known switch resistances, and electrodes 512A (Y+) and 612B (Y−). In the passive layer, the system 500 may include switches 525A, 525B having known switch resistances, and electrodes 522A (X+) and 522B (X−). The electrodes 512A, 512B, 522A and 522B may each be connected to a position determination system 200 as illustrated in FIG. 2 wherein signals at each of the electrodes may be measured during touch operations.

When dual touches, e.g., a high touch and a low touch are applied, a sheet resistance of the active layer 510 may be conceptually segmented into representative resistances $R_U$, $R_M$, and $R_D$. The resistance $R_U$ may represent the component of sheet resistance from the electrode 512A to the location of the high touch. The resistance $R_M$ may represent the component of sheet resistance from the location of the high touch to the location of the low touch, and the resistance $R_D$ may represent the component of sheet resistance from the location of the low touch to the electrode 512B.

Further, a sheet resistance of the passive layer 520 may be conceptually segmented into representative resistances $R_P$, $R_L$, and $R_R$. The resistance $R_P$ may represent the component of sheet resistance for the passive layer between the location of the high and low touches. The resistance $R_L$ may represent the resistance between the high touch and the electrode 522A, and the resistance $R_R$ may represent the resistance between the low touch and the electrode 522B.

In addition, there may be a touch resistance $RT_{HI}$ that may result from the touching of the active layer 510 to the passive layer 520 at the location of the high touch. Similarly, a touch resistance $RT_{LO}$ may result from the touching of the active layer 510 to the passive layer 520 at the location of the low touch. The touch resistances $RT_{HI}$, $RT_{LO}$ may vary due to the amount of touch pressure being applied by each respective touch on the touch screen. For example, a light pressure touch will result in a touch resistance value that is higher than that of a heavy pressure touch.

During a first operational phase of the system 500, a predetermined voltage $V_{CC}$ may be driven to electrode 512A of the active layer 510 via switch 515A (shown closed), and the electrode 512B may be connected to ground via switch 515B. Switches 525A and 525B for the passive layer 520 may remain open. A position determination system (not shown) connected to each of the electrodes 512A, 512B, 522A, 522B may measure signals from the electrodes.

During a second operational phase, the predetermined voltage $V_{CC}$ may be driven on the previously passive layer (the X-layer 520) to electrode 522A via switch 525A (shown open), and the electrode 522B may be connected to ground via switch 525B (shown open). Switches 515A and 515B be may be opened for the X layer 510. The signals from the electrodes 512A, 512B, 522A, and 522B may be measured by the position determination system. After gathering the signals through each operational phase, the position determination system may determine touch locations using the representative segment resistances.

FIG. 6 illustrates an electrical model 600 of a four-wire resistive touch screen describing the relationship between resistive touch screen segment resistances and dual touch positions according to an embodiment of the present invention. As noted, a system (e.g., system 200 of FIG. 2) for determining touch positions may operate to measure signals for a first and second layer through two phases of operation. In each phase, the system may drive a predetermined voltage to an active layer.

FIG. 6(a) illustrates an exemplary resistance model 600 for a first phase of operation wherein a predetermined voltage $V_{CC}$ may be driven across a Y layer to $V_{GND}$ (0V), making it the active layer. The resistive touch screen may have a high touch and a low touch. Voltages $V_{A1}$, $V_{B1}$, $V_{L1}$, $V_{R1}$ (i.e., voltages from the Y+, Y−, X+, and X− electrodes of FIG. 5) or current $I_1$ may be measured during the first operational phase. The touch resistance for the high touch, $RT_{HI}$, and the low touch, $RT_{LO}$, may be assumed to be constant during the touch. The remaining segment resistances $Z_1$, $R_U$, $R_D$, $R_{m1}$, $R_{m2}$, $R'_{m1}$, $R'_{m2}$, $R_L$, $R_R$, $R_X$, and $R_Y$ and voltages $V_{A1}$, and $V_{B1}$, may be determined using a system of equations. Such equations may be exemplified as:

$$V_{CC} - V_{A1} = I_1 \cdot R_U \qquad \text{Eq. 1}$$

$$V_{B1} - V_{GND} = I_1 \cdot R_D$$

$$V_{A1} - V_{B1} = I_1 \cdot Z_1$$

$$Z_1 = R_{m1} \parallel (RT_{HI} + RT_{LO} + R'_{m1})$$

$$R_{m1} = R_Y - R_U - R_D$$

$$R'_{m1} = \sqrt{\left(R_{m1} \frac{R_X}{R_Y}\right)^2 + (R_{m2})^2}$$

$$V_{A1} + V_{B1} = V_{A1'} + V_{B1'}$$
$$= \frac{R_X(R_X + R_L) - R_R(R_X - R_R)}{R_X(R_X - R_R)} V_{L1} - \frac{R_R}{R_X} V_{R1}$$

FIG. 6(b) illustrates an exemplary resistance model 600 for a second phase of operation wherein a predetermined voltage $V_{CC}$ may be driven across an X layer to $V_{GND}$ (0V), making it the active layer. The resistive touch screen may have the same high touch and a low touch as for FIG. 6(a) and may be assumed to be constant during the touch. Voltages $V_{A2}$, $V_{B2}$, $V_{L2}$, $V_{R2}$ or current $I_2$ may be measured during the second operational phase. The remaining segment resistances $Z_1$, $R_U$, $R_D$, $R_{m1}$, $R_{m2}$, $R'_{m1}$, $R'_{m2}$, $R_L$, $R_R$, $R_X$, and $R_Y$ and voltages $V_{A2}$, and $V_{B2}$, may be determined using a system of equations. Such equations may be exemplified as:

$$V_{CC} - V_{A2} = I_2 \cdot R_L \qquad \text{Eq. 2}$$

$$V_{B2} - V_{GND} = I_2 \cdot R_R$$

-continued $$V_{A2} - V_{B2} = I_2 \cdot Z_2$$

$$Z_2 = R_{m2} \parallel (RT_{HI} + RT_{LO} + R'_{m2})$$

$$R_{m2} = R_X - R_L - R_R$$

$$R'_{m2} = \sqrt{(R_{m1})^2 + \left(R_{m2} \frac{R_Y}{R_X}\right)^2}$$

$$V_{A2} + V_{B2} = V_{A2'} + V_{B2'}$$
$$= \frac{R_Y(R_Y + R_U) - R_D(R_Y - R_D)}{R_Y(R_Y - R_D)} V_{L2} - \frac{R_D}{R_Y} V_{R2}$$

Equations similar to those described for each phase of operation may be combined to determine segment resistance values for $R_U$, $R_D$, $R_L$, and $R_R$. Because the resistive touch screen may represent a finite area of space, X-Y coordinates representing locations for the high and low touches may be determined from the segment resistances.

Figure 7:
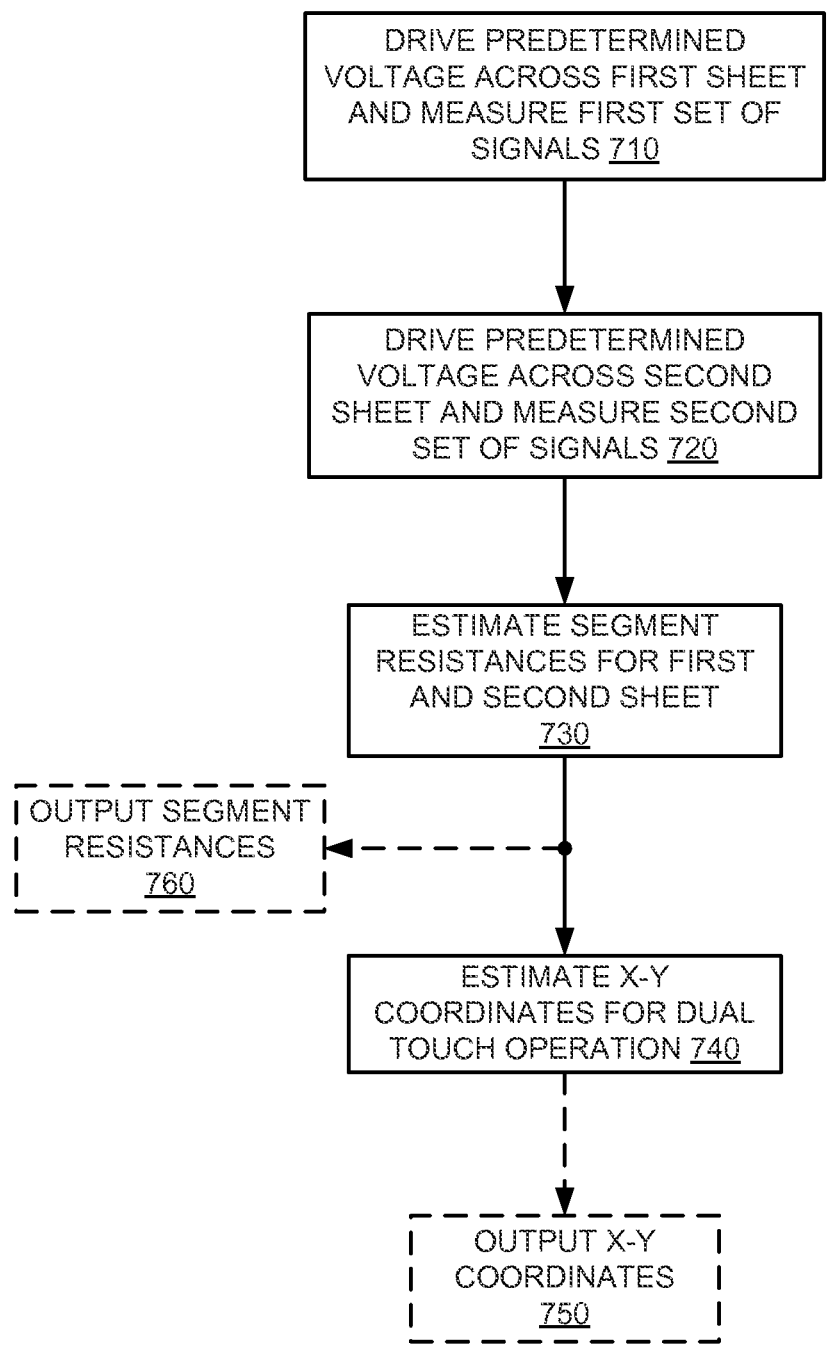
FIG. 7 illustrates a method 700 for determining locations for a dual touch operation performed on a four-wire resistive touch screen according to an embodiment of the present invention.

FIG. 7 illustrates a method 700 for determining locations for dual touch operations performed on a four-wire resistive touch screen according to an embodiment of the present invention. As illustrated in block 710, the method 700 may drive a predetermined voltage across a first resistive sheet of the resistive touch screen and measure a first set of signals from pairs of electrodes on the first resistive sheet and a second resistive sheet. The method 700 may drive the predetermined voltage across the second resistive sheet and measure a second set of signals from pairs of electrodes on the first resistive sheet and the second resistive sheet (block 720). The method may estimate segment resistances generated across the first and second resistive sheets by the dual touch operation from the first and second sets of measured signals (block 730). The method 700 may estimate X-Y coordinates representing locations of the dual touch operation from the estimated segment resistances (block 740).

In an embodiment, the method 700 may output the X-Y coordinates corresponding to the dual touch operation (block 750). In an embodiment, the method 700 may output the calculated segment resistances (block 760).

Figure 8:
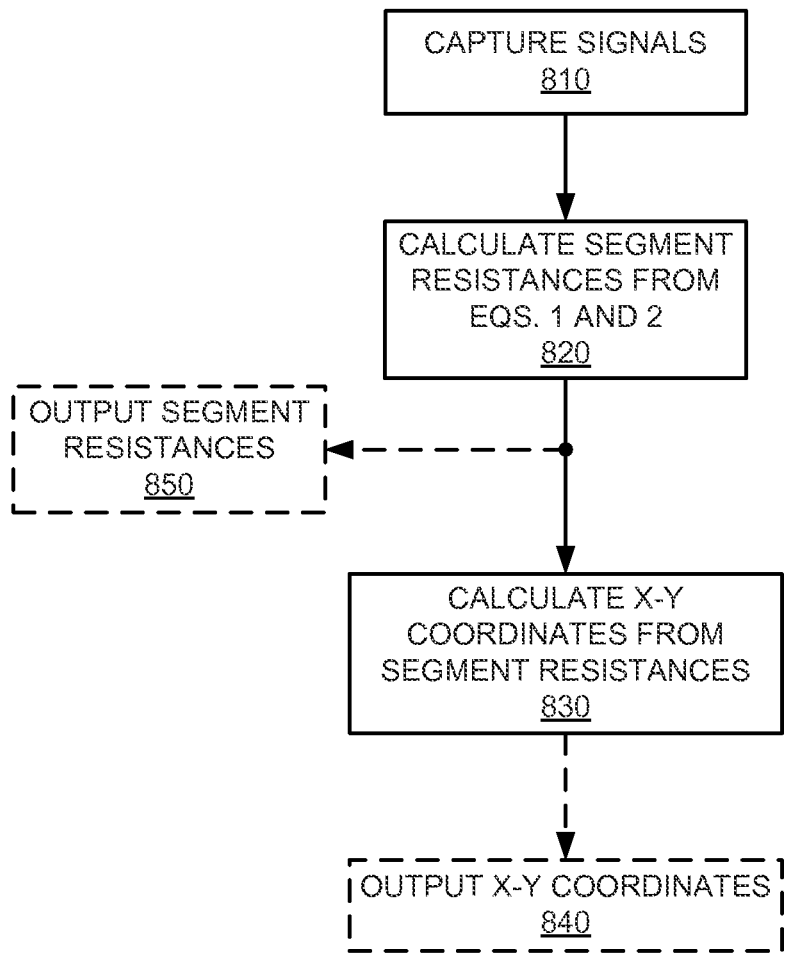
FIG. 8 illustrates a method 800 for determining locations for a dual touch operation performed on a four-wire resistive touch screen from calculated segment resistances according to an embodiment of the present invention.

FIG. 8 illustrates a method 800 for determining locations for a dual touch operation performed on a four-wire resistive touch screen from calculated segment resistances according to an embodiment of the present invention. As illustrated in block 810, the method 800 may capture signals from pairs of electrodes of resistive sheets of the resistive touch screen during the dual touch operation. The method 800 may calculate the segment resistances across a first and second resistive sheet of the resistive touch screen according to Eqs. 1 and 2 (block 820). The method 800 may calculate X-Y coordinates representing locations of the dual touch operations from the calculated segment resistances (block 830).

In an embodiment, the method 800 may output the X-Y coordinates corresponding to the dual touch operation (block 840). In an embodiment, the method 800 may output the calculated segment resistances (block 850).

Figure 9:
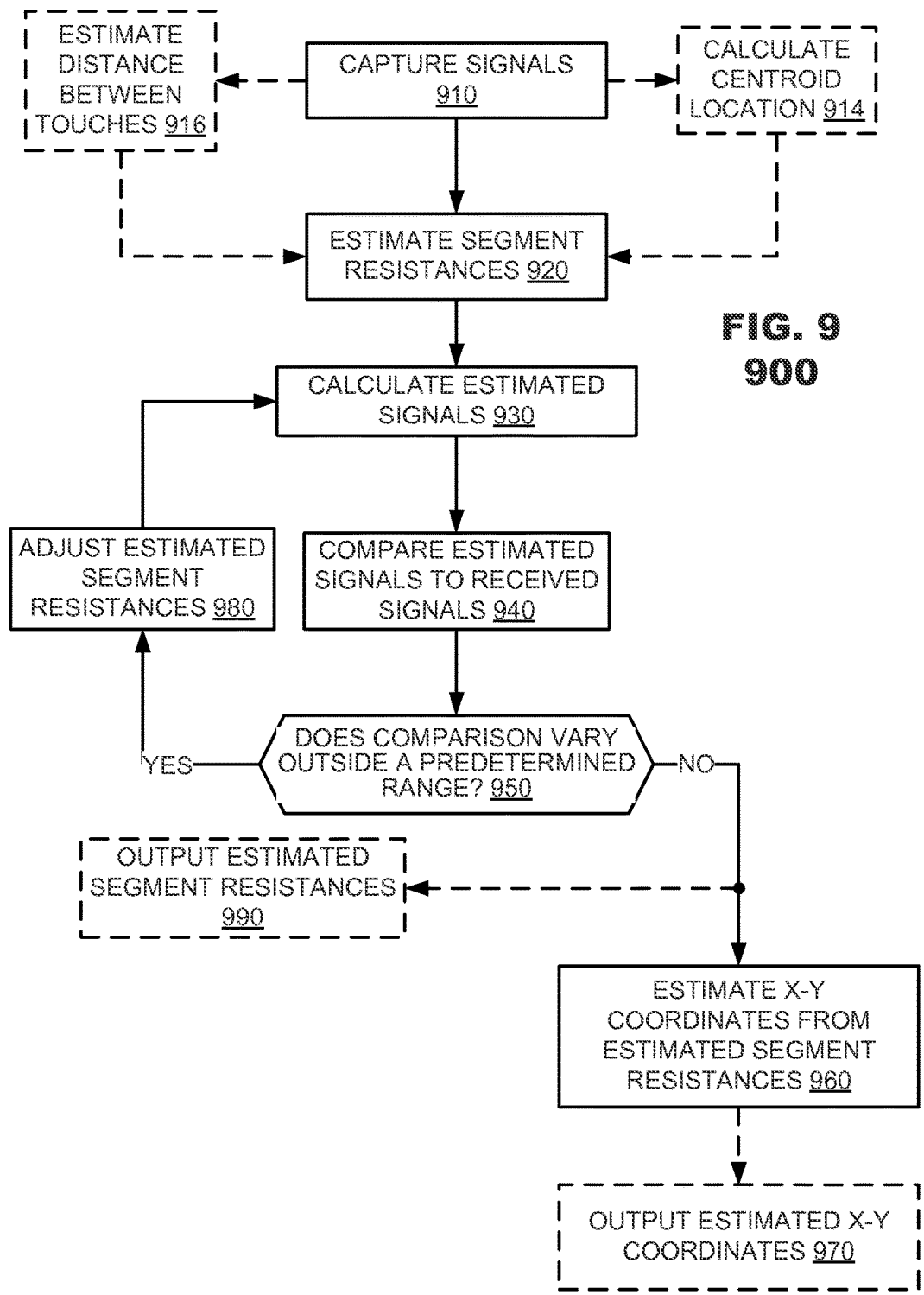
FIG. 9 illustrates a method 900 for determining estimated locations for a dual touch operation performed on a four-wire resistive touch screen from estimated segment resistances according to an embodiment of the present invention.

FIG. 9 illustrates a method 900 for determining estimated locations for a dual touch operation performed on a four-wire resistive touch screen from estimated segment resistances according to an embodiment of the present invention. As illustrated in block 910, the method 900 may capture signals from pairs of electrodes of resistive sheets of the resistive touch screen during the dual touch operation. The method 900 may estimate segment resistances across a first and second resistive sheet for the resistive touch screen from the captured signals (block 920). The method 900 may calculate estimated signals for the first and second resistive sheets according to a multi-segment resistor model populated by the segment resistances (block 930).

The method 900 may compare the estimated signals to the captured signals and determining an error value therefrom (block 940). The method 900 may check the error value against a predetermined range (block 950). If the error value is within the predetermined range, the method 900 may estimate locations of the dual touch operation from the estimated segment resistances (block 960). In an embodiment, the method 900 may output the estimated X-Y coordinates corresponding to the locations (block 970). If the error value is outside the predetermined range, the method 900 may adjust the estimated segment resistances (block 980) and calculate new estimated signals (return to block 930). In an embodiment, if the error value is within the predetermined range, the method 900 may output the estimated segment resistances (block 990).

In another embodiment, the method 900 may calculate a centroid location for each resistive sheet (block 914). As disclosed in related application Ser. No. 12/851,291, a centroid location for the first and second resistive sheets may be calculated from signals captured from pairs of electrodes of resistive sheets of the resistive touch screen for the dual touch operation. In an embodiment, the method 900 may estimate the distance of between each touch for the dual touch operation (block 916). The method 900 may estimate segment resistances across the first and second resistive sheet for the resistive touch screen from the estimated distance (block 920).

A system may also be configured to determine locations for two touch positions using a supervised learning method. A supervised learning process may include inputting data sets having known input values and output values to a system of calculations having adjustable operational parameters. The system may output values and the system output values may be compared against the known output values. The system may adjust operational parameters based on the error between the system and expected output values. Under a supervised learning process, data sets may be iteratively fed to the system, the outputs compared, and the system re-calibrated. This process may continue until the difference between the expected values and the system outputs may be within a predetermined tolerance. An artificial neural network may be configured using a supervised learning process.

Figure 10:
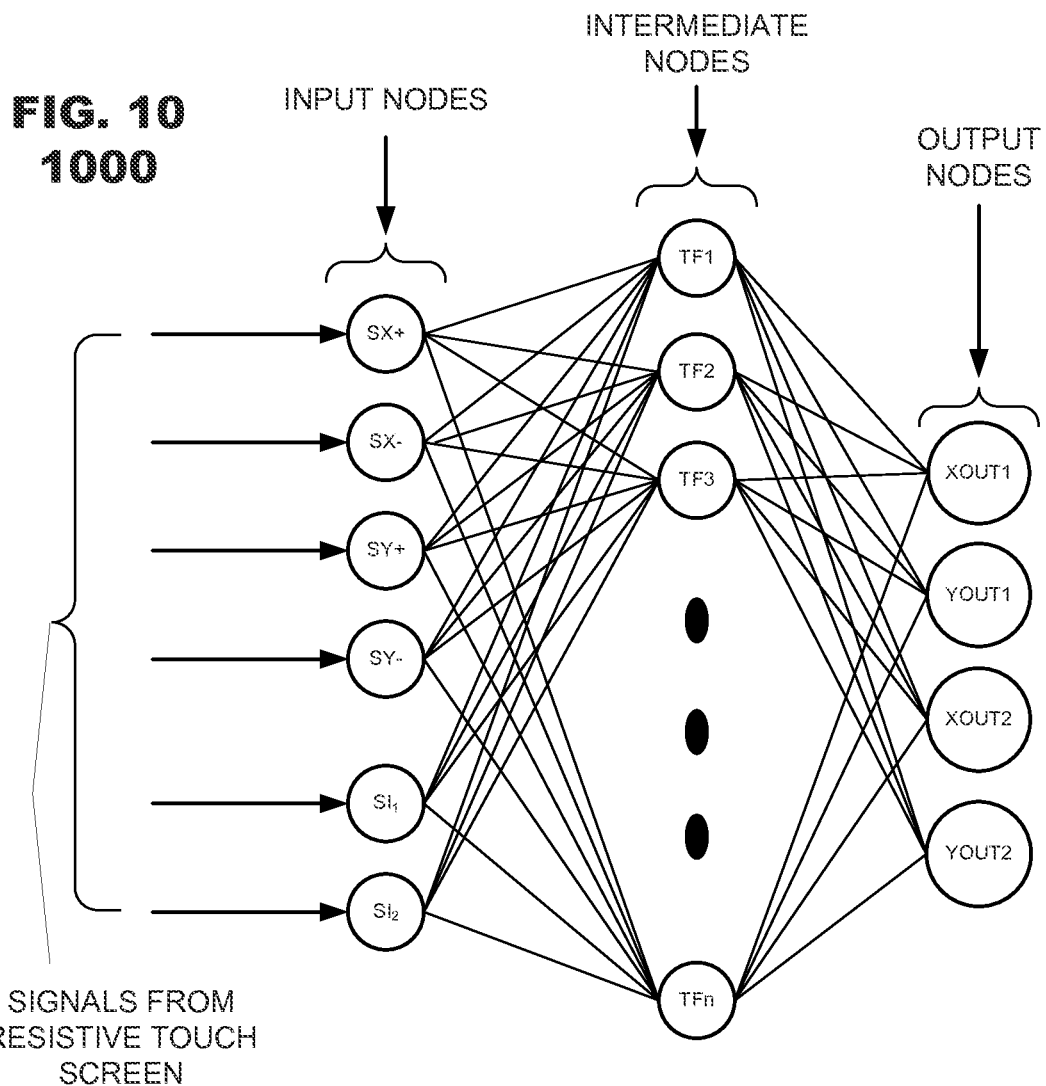
FIG. 10 illustrates an artificial neural network 1000 for determining estimated locations for a dual touch operation performed on a four-wire resistive touch screen according to an embodiment of the present invention.

FIG. 10 illustrates an artificial neural network 1000 for determining estimated locations for a dual touch operation performed on a four-wire resistive touch screen according to an embodiment of the present invention. The network 1000 may be represented by input nodes that may apply input scaling factors SX+, SX−, SY+, SY−, SI$_1$, and SI$_2$ to signals captured from the resistive touch screen. Each of the input nodes may feed the scaled signals to intermediate nodes TF1-TFn. Within each intermediate node TF1-TFn the scaled signals may be linearly combined and a non-linear calculation may be performed on the linearly combined signals. Outputs from the intermediate nodes TF1-TFn may feed output nodes XOUT1, YOUT1, XOUT2, and YOUT2. Within each output node, signals from the transfer function nodes may be linearly combined and a non-linear calculation may be performed on the linearly combined signals. The output nodes XOUT1, YOUT1, XOUT2, and YOUT2 may output values that may be the estimated X-Y coordinates corresponding to estimated locations for the two touch operations.

Each intermediate node TF1-TFn and each output node XOUT1, YOUT1, XOUT2, and YOUT2 may include a summing calculation which may combine the scaled input signals. The output of the summing calculation may be adjusted using a non-linear calculation. In an embodiment, the non-linear calculation for each intermediate node TF1-TFn or each output node XOUT1, YOUT1, XOUT2, and YOUT2 may include a sigmoid calculation. An example of a sigmoid calculation may be represented by the following mathematical relationship:

$$P(t) = \frac{1}{1+e^{-t}} \qquad \text{Eq. 3}$$

where t may represent the output of the summing calculation within either the intermediate or the output nodes.

In another embodiment, the non-linear calculation for each intermediate node or each output node XOUT1, YOUT1, XOUT2, and YOUT2 may include a piece-wise linear calculation. An example of a piece-wise linear calculation may be represented by the following mathematical relationship:

$$[t]=0 \text{ if } (t \leq 0), [t]=t \text{ if } (0<t<1), \text{ and } [t]=1 \text{ if } (1 \leq t) \qquad \text{Eq. 4}$$

where t may represent the output of the summing calculation within either the intermediate or the output nodes. A piece-wise linear calculation may be less computationally expensive than a sigmoid calculation. In another embodiment, the non-linear calculation for each intermediate node or each output node may include a hyperbolic tangent calculation. In another embodiment, the non-linear calculation for each intermediate node or each output node may include an arctangent calculation.

The network 1000 may be calibrated using a supervised learning process that may have two phases: a training phase and a validation phase. A final testing phase may be implemented to characterize the precision of the network following calibration. After the network has been calibrated, it may be implemented in a processing unit (e.g., unit 240 of FIG. 2). During the training phase, training data sets may be input to the network 1000. The training data sets may represent signals measured from a resistive touch screen having sets of dual touch operations performed on the screen. The locations of the dual touch operations for the training data set may be known. The values output from the output nodes XOUT1, YOUT1, XOUT2, and YOUT2 of the network 1000 may be used to estimate X-Y coordinates representing estimated locations of the dual touch operations. The estimated locations may be measured against the known locations. In response to the difference between the locations, operational parameters including the scaling factors for the input nodes may be adjusted. Further, the number of intermediate nodes TF1-TFn may be increased or decreased. Also, the internal connections between the input nodes, the intermediate nodes, and the output nodes may be adjusted.

During the validation phase, different data sets, say validation data sets may be input to the network 1000. The validation data sets may represent signals measured from a resistive touch screen having sets of dual touch operations performed on the screen. The locations of the dual touch operations for the validation data set may be known. The values output from the network 1000 output nodes XOUT1, YOUT1, XOUT2, and YOUT2 may be used to estimate X-Y coordinates representing estimated locations of the dual touch operations. The estimated locations may be compared to the known locations to determine error of the network. For a first iteration through the training and validation phase, the network may return to the training phase if the error is above a predetermined threshold. After the first iteration, the network may return to the training phase so long as the network error may decrease through successive calibration iterations. When the error may stop decreasing or may begin to increase, the calibration may stop and the network may recover the operational parameters from the previous iteration.

After the training and validation phases may conclude, the final testing phase may begin. Final testing data sets that were not used during the training and validation phases may be input to the network 1000. The final testing data sets may represent signals measured from a resistive touch screen having sets of dual touch operations performed on the screen. The locations of the dual touch operations for the final testing data sets may be known. The values output from the network 1000 output nodes XOUT1, YOUT1, XOUT2, and YOUT2 may be used to estimate X-Y coordinates representing estimated locations of the dual touch operations. The estimated locations may be compared to the known locations. The difference between the locations may be used to characterize the precision of the network 1000.

Once the network 1000 may be calibrated, it may be incorporated into a processing unit (e.g., unit 240 of FIG. 2) to determine touch locations for two touch operations that may be performed on a resistive touch screen.

Figure 11:
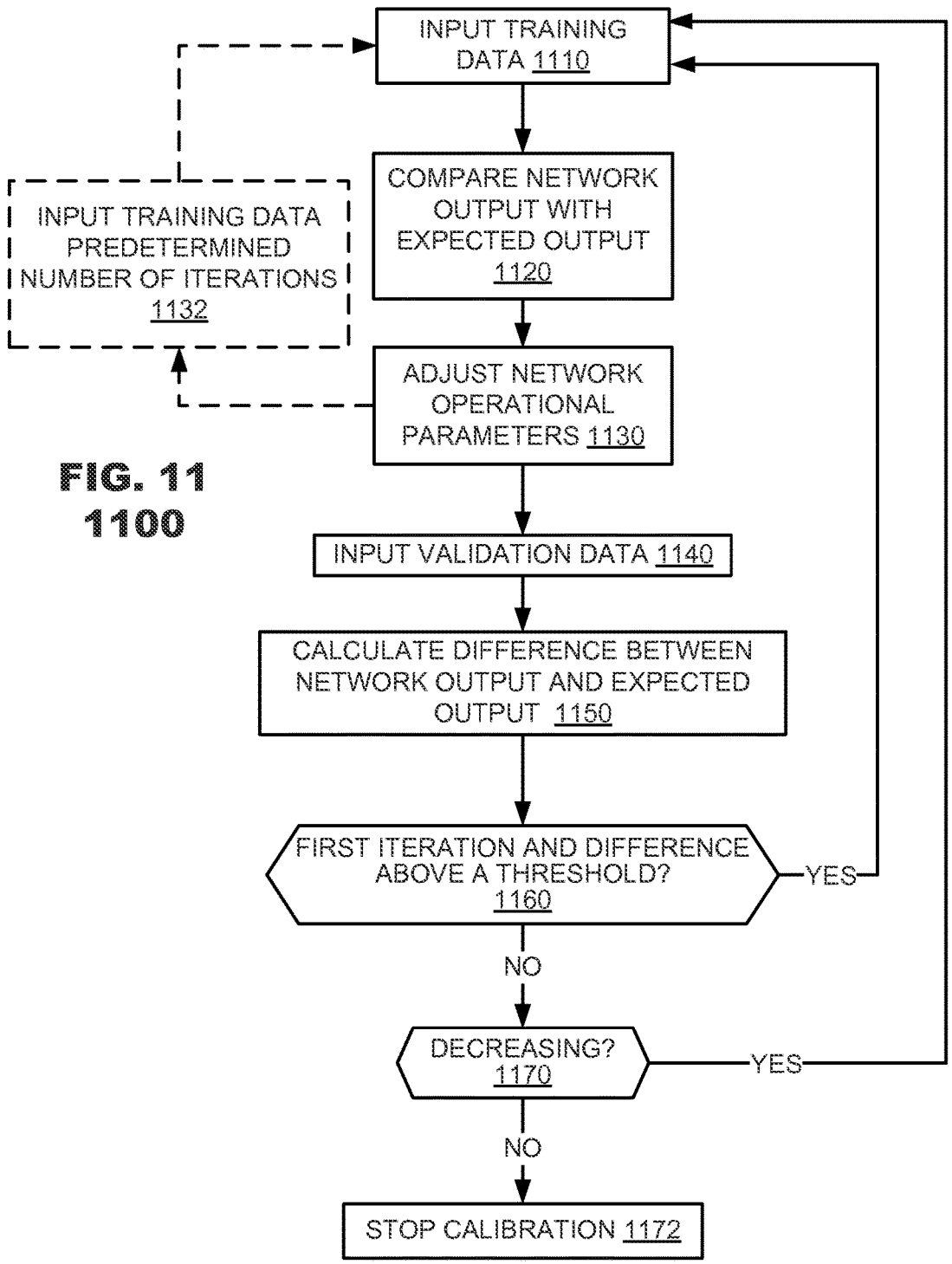
FIG. 11 illustrates a method 1100 for calibrating an artificial neural network for determining locations for a dual touch operation performed on a four-wire resistive touch screen using a supervised learning process according to an embodiment of the present invention.

FIG. 11 illustrates a method 1100 for calibrating an artificial neural network for determining locations for a dual touch operation performed on a four-wire resistive touch screen using a supervised learning process according to an embodiment of the present invention. The method 1100 may include inputting training data sets into the artificial neural network (block 1110). The method may then compare the network output values with the expected output values for the training data sets (block 1120). The method 1100 may adjust operational parameters for the artificial neural network based on the comparison (block 1130).

The method 1100 may then input validation data sets to the artificial neural network (block 1140). The method may calculate the difference between network output values and the expected output values for the validation data sets (block 1150). If the method is within a first iteration and the difference is above a predetermined threshold, the method may return to inputting the training data sets (block 1160). Otherwise, if the difference between the network output values and the expected output values for the validation data set may decrease through successive iterations, the method may return to inputting the training data sets (block 1170). If the difference may stop decreasing, the method 1100 may stop the calibration and may reset the operational parameters to the settings from the previous iteration (block 1172).

In an embodiment, the method 1100 may input the training data sets to the network for a predetermined number of iterations before inputting the validation data sets to the artificial neural network (block 1132).

Figure 12:
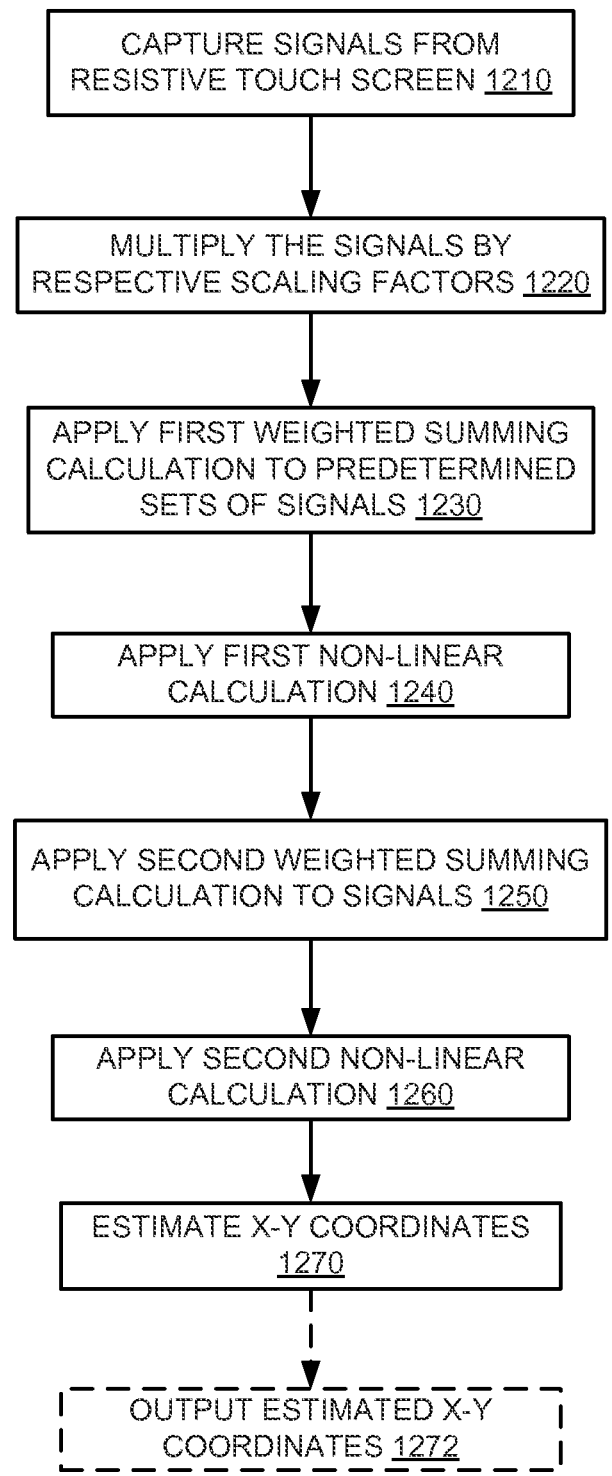
FIG. 12 illustrates a method 1200 for determining estimated locations for a dual touch operation performed on a four-wire resistive touch screen using an artificial neural network according to an embodiment of the present invention.

FIG. 12 illustrates a method 1200 for determining estimated locations for a dual touch operation performed on a four-wire resistive touch screen using an artificial neural network according to an embodiment of the present invention. As illustrated in block 1210, determining dual touch positions may include capturing signals from pairs of electrodes of resistive sheets of the resistive touch screen. The method 1200 may then multiply the signal by respective scaling factors (block 1220). Next, the method 1200 may apply a first weighted summing calculation to predetermined sets of the scaled signals (block 1230). The method 1200 may apply first a non-linear calculation to the signals (block 1240). The method 1200 may apply a second weighted summing calculation to the signals (block 1250). The method 1200 may apply a second non-linear calculation to the signals (block 1260). The method 1200 may estimate X-Y coordinates representing locations of the dual touch operation from the signals (block 1270). In an embodiment, the method 1200 may output the estimated X-Y coordinates (block 1272).

FIG. 13 illustrates a method for determining estimated locations for a dual touch operation performed on a four-wire resistive touch screen from a centroid location and an estimated touch distance according to an embodiment of the present invention. As illustrated in FIG. 13, the method 1300 may capture signals from pairs of electrodes of resistive sheets of the resistive touch screen during the dual touch operation (block 1310). The method 1300 may calculate a centroid location for each resistive sheet (block 1320). The method may estimate the distance between each touch for the dual touch operation (block 1330). The method may calculate estimated X-Y coordinates representing locations of the dual touch operations from the centroid and estimated distance (block 1340).

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A method for determining estimated locations for a dual touch operation performed on a four-wire resistive touch screen, the method comprising:
   capturing signals from pairs of electrodes of first and second resistive sheets of the resistive touch screen during the dual touch operation;
   estimating segment resistances for the first and second resistive sheets of the resistive touch screen;
   calculating estimated signals for the first and second resistive sheets according to a multi-segment resistor model populated by the estimated segment resistances;
   comparing the estimated signals to the captured signals and determining an error value therefrom; and
   if the error value is within a predetermined range, estimating X-Y coordinates representing locations of the dual touch operation from the estimated segment resistances.

2. The method of claim 1, further comprising:
   if the error value is outside the predetermined range:
      adjusting the estimated segment resistances;
      calculating adjusted estimated signals for the first and second resistive sheets according to the multi-segment resistor model populated by the adjusted segment resistances; and
      comparing the adjusted estimated signals to the captured signals and determining an error value therefrom.

3. The method of claim 1, further comprising:
   calculating a centroid location of the dual touch operation, and
   estimating the distance between each touch of the dual touch operation,
   wherein the estimating of the segment resistances is based on the calculated centroid location and estimated distance between each touch.

4. The method of claim 1, wherein the capturing signals includes:
   driving a first voltage across the first resistive sheet of the touch screen and measuring a first set of signals from the pairs of electrodes of the first and second resistive sheets; and driving a second voltage across the second resistive sheet of the touch screen and measuring a second set of signals from the pairs of electrodes of the first and second resistive sheets.

5. The method of claim 1, wherein the captured signals are voltages at the pairs of electrodes.

6. The method of claim 1, wherein the captured signals are currents for each of the first and second resistive sheets.

7. The method of claim 1, wherein the estimating of the segment resistances is based on the captured signals.

8. An apparatus for determining estimated locations for a dual touch operation performed on a four-wire resistive touch screen, the apparatus comprising:
   inputs to capture signals from pairs of electrodes of first and second resistive sheets of the resistive touch screen during the dual touch operation; and
   a processing unit configured to:
      estimate segment resistances for the first and second resistive sheets of the resistive touch screen;
      calculate estimated signals for the first and second resistive sheets according to a multi-segment resistor model populated by the estimated segment resistances;
      compare the estimated signals to the captured signals and determining an error value therefrom; and
      if the error value is within a predetermined range, estimate X-Y coordinates representing locations of the dual touch operation from the estimated segment resistances.

9. The apparatus of claim 8, wherein the processing unit is configured to:
   if the error value is outside the predetermined range:
      adjust the estimated segment resistances;
      calculate adjusted estimated signals for the first and second resistive sheets according to the multi-segment resistor model populated by the adjusted segment resistances; and
      compare the adjusted estimated signals to the captured signals and determining an error value therefrom.

10. The apparatus of claim 8, wherein the processing unit is configured to:
    calculate a centroid location of the dual touch operation, and
    estimate the distance between each touch of the dual touch operation,
    wherein the estimating of the segment resistances is based on the calculated centroid location and estimated distance between each touch.

11. The apparatus of claim 8, wherein the captured signals are captured at the inputs by:
    driving a first voltage across the first resistive sheet of the touch screen and measuring a first set of signals from the pairs of electrodes of the first and second resistive sheets; and
    driving a second voltage across the second resistive sheet of the touch screen and measuring a second set of signals from the pairs of electrodes of the first and second resistive sheets.

12. The apparatus of claim 8, wherein the captured signals are voltages at the pairs of electrodes.

13. The apparatus of claim 8, wherein the captured signals are currents for each of the first and second resistive sheets.

14. The apparatus of claim 8, wherein the estimating of the segment resistances is based on the captured signals.

* * * * *